US008165780B2

United States Patent
Russell

(10) Patent No.: US 8,165,780 B2
(45) Date of Patent: *Apr. 24, 2012

(54) BOOSTED ENGINE CONTROL RESPONSIVE TO DRIVER SELECTED PERFORMANCE

(75) Inventor: John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,398

(22) Filed: Feb. 8, 2011

(65) Prior Publication Data

US 2011/0126797 A1 Jun. 2, 2011

Related U.S. Application Data

(63) Continuation of application No. 12/124,911, filed on May 21, 2008, now Pat. No. 7,890,241.

(51) Int. Cl.
*F02D 41/00* (2006.01)
*G06F 19/00* (2011.01)
(52) U.S. Cl. ........................................... 701/103
(58) Field of Classification Search .......... 701/103–105; 123/294–305, 478, 1 A, 480, 575
See application file for complete search history.

(56) References Cited

U.S. PATENT DOCUMENTS

| | | | |
|---|---|---|---|
| 5,383,431 A | 1/1995 | Nishimura et al. | |
| 5,636,614 A | 6/1997 | Morikawa | |
| 5,778,858 A | 7/1998 | Garabedian | |
| 6,044,318 A | 3/2000 | Bourdon et al. | |
| 6,123,163 A | 9/2000 | Otsu et al. | |
| 6,591,817 B2 | 7/2003 | Deutsch | |
| 6,814,032 B2 | 11/2004 | Goto | |
| 7,621,256 B2 | 11/2009 | Cunningham et al. | |
| 7,640,914 B2 | 1/2010 | Lewis et al. | |
| 7,845,334 B2 * | 12/2010 | Lippa et al. | 123/575 |
| 7,890,241 B2 * | 2/2011 | Russell | 701/103 |
| 2005/0143898 A1 | 6/2005 | Kaneko et al. | |

* cited by examiner

*Primary Examiner* — Hieu T Vo
(74) *Attorney, Agent, or Firm* — Allan J. Lippa; Alleman Hall McCoy Russell & Tuttle LLP

(57) ABSTRACT

Various systems and methods are described for operating an engine in a vehicle in response to a driver performance/economy mode. One example method comprises delivering a first fuel to a cylinder of the engine from a first injector, delivering a second, different, fuel to the cylinder of the engine from a second injector, varying a relative amount of said first and second fuel as an operating condition varies; and adjusting delivery of at least said second fuel based on a driver-selected performance mode.

16 Claims, 6 Drawing Sheets

BOOSTED ENGINE CONTROL RESPONSIVE TO DRIVER SELECTED PERFORMANCE

CROSS REFERENCE TO RELATED APPLICATIONS

The present application is a continuation of U.S. patent application Ser. No. 12/124,911 filed May 21, 2008, now U.S. Pat. No. 7,890,241 B2 issued on Feb. 15, 2011, the entire contents of which are incorporated herein by reference.

FIELD

The present description relates to a method for controlling an internal combustion engine operating with a variety of fuels of varying composition and fuel delivery options.

BACKGROUND AND SUMMARY

Engines may use various forms of fuel delivery to provide a desired amount of fuel for combustion in each cylinder. One type of fuel injection, or delivery, uses a port injector for each cylinder to deliver fuel to respective cylinders. Another type of fuel injection uses a direct injector for each cylinder. Engines have also been described using more than one injector to provide fuel to a single cylinder in an attempt to improve engine performance.

One such example (U.S. 2007/0119422 A1) describes a flexible multiple-fuel engine using both port and direct injection, where different fuel types are provided to the injectors. For example, direct injection of ethanol may be used with port injected gasoline to address knock limitations, especially under boosted conditions. In this example, a desired setting for the various fuels may be predetermined using engine maps, and then adjusted based on feedback from a knock sensor. Specifically, the effective knock suppression of the fuels can be varied responsive to operating conditions to improve engine efficiency while meeting engine output requirements.

However, the inventor herein has recognized several issues with such an approach. As one example, the above predetermined settings for the fuel distribution may be set based on an average operator driving cycle, where knock sensor feedback is relied upon to address variation in the operator driving habits. In this case, aggressive drivers may consistently experience transient knock before the system can react to the knock sensor feedback and adjust the fuel injection location/ composition to abate the engine knock. Additionally, conservative drivers may consistently experience less fuel economy gains than otherwise possible and/or unnecessarily high ethanol consumption rates.

To address this and other issues, one example approach uses a method for operating an engine in a vehicle, the method comprising: delivering a first fuel to a cylinder of the engine from a first injector, delivering a second fuel to the cylinder of the engine from a second injector, (where, for example, the second fuel has a greater heat of vaporization than the first fuel), varying a relative amount of the first and second fuel as an operating condition varies; and adjusting delivery of at least the second fuel based on a driver selected engine operating mode.

In this way, it is possible to adjust, for example, both predetermined fuel injection settings, as well as feedback gains, to better match the engine performance to the driver's selected mode. In the example of a performance mode setting, the predetermined settings can be adjusted to increase, at a given speed/load, compared to a fuel economy mode, usage of the fuel providing increased knock suppression capabilities and/or an increased heat of vaporization. As such, the system may rely less on knock sensor feedback to correct inadvertent knock during transient load changes by ensuring sufficient knock suppression is already present. Likewise, in the example of a fuel economy mode setting, the predetermined settings can be adjusted to decrease the knock suppression capabilities of the fuel injection, and rely more heavily on knock sensor feedback. As such, the system may conserve knock suppression capabilities until actually needed and use the information of the performance setting to predict reduced transients.

DETAILED DESCRIPTION

The following description relates to a method for operating an engine in a vehicle wherein an engine control system is configured to adjust engine operating parameters in response to a driver selected mode of operation. For example, the driver may indicate a preference towards a high performance mode or a fuel economy mode. Based on the mode selection, the control system may better turn vehicle performance to the driver. Consequently, the control system can better anticipate engine operating constraints and the engine may be further configured to better deal with the anticipated constraints by appropriately adjusting engine operating parameters. Parameters such as a rate of usage of a fuel with knock suppression capabilities, a minimum boost level, a transmission shift schedule, for example, may be differently adjusted based on whether a performance mode or a fuel economy mode is selected.

In one example, the engine may be configured to perform adjustments in anticipation of the constraints in a performance mode, to reduce reliance on feedback from the respective constraint related feedback sensors. In contrast, the engine may be configured to rely more heavily on feedback sensors for dealing with engine operating constraints in the fuel economy mode. In this way, engine and vehicle performance may be customized to the driver's driving habits.

Figure 1:
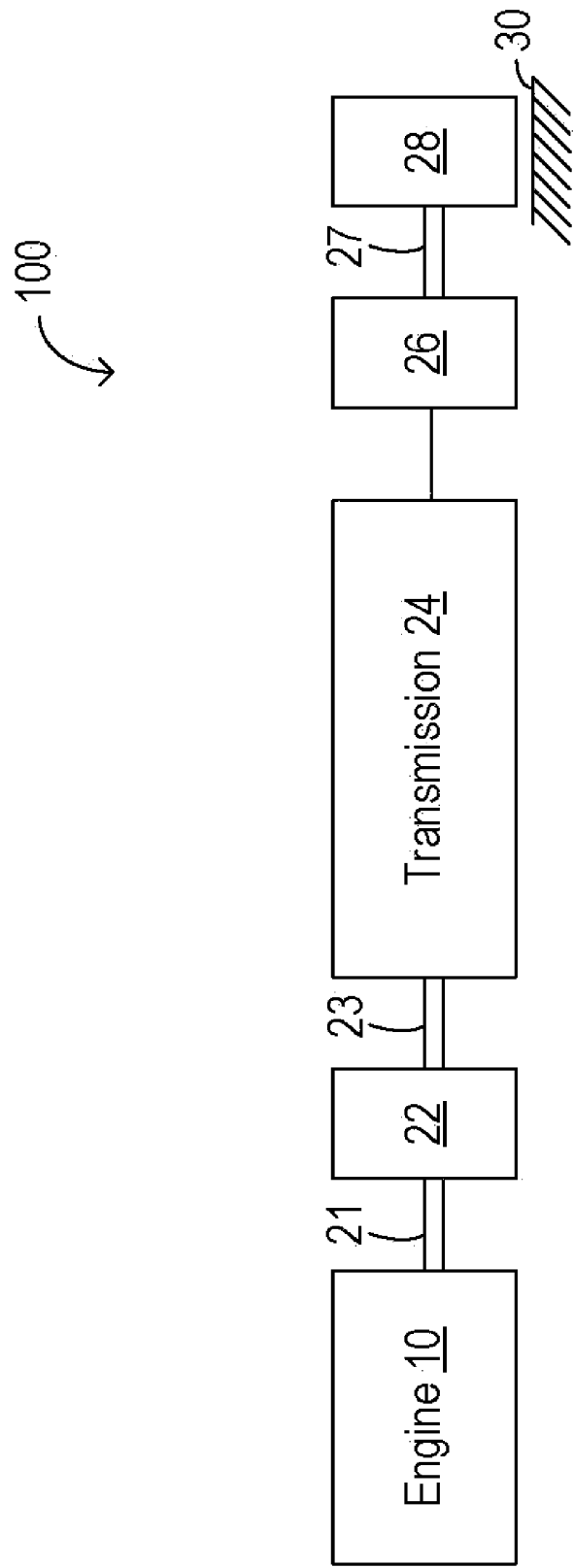
FIG. 1 is a block diagram of a vehicle illustrating various components of the powertrain system.
Figure 2:
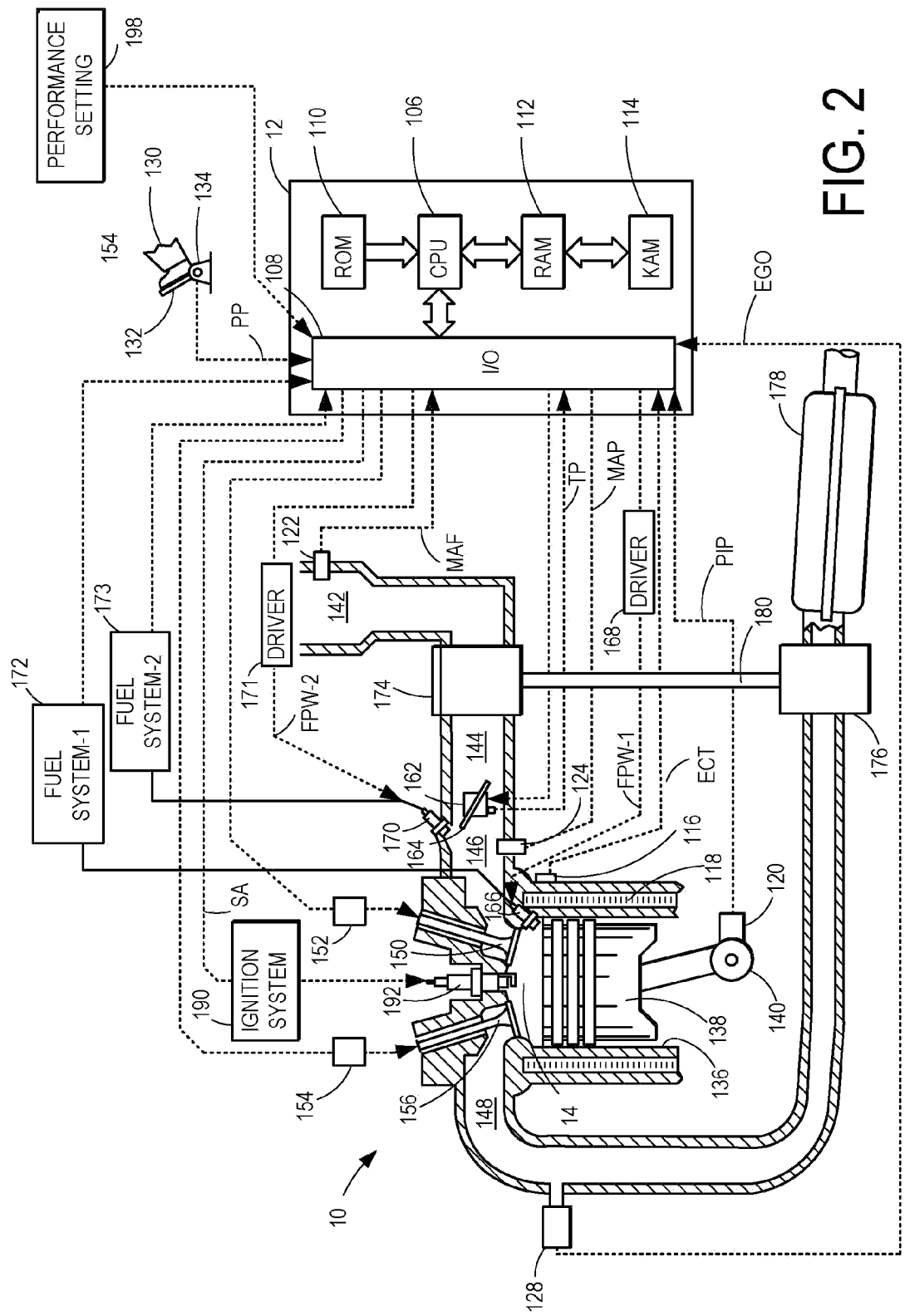
FIG. 2 shows an example embodiment of a combustion chamber operating with a plurality of fuel injector options.

FIG. 1 depicts an example embodiment of a vehicle powertrain system 100. As illustrated, an internal combustion engine 10, further described herein in FIG. 2, is shown coupled to torque converter 22 via crankshaft 21. Torque converter 22 is also coupled to transmission 24 via turbine shaft 23. Torque converter 22 has a bypass, or lock-up clutch (not shown) which may be engaged, disengaged, or partially engaged. When the clutch is either disengaged or partially engaged, the torque converter is said to be in an unlocked state. The lock-up clutch may be actuated electrically, hydraulically, or electro-hydraulically, for example. The lock-up clutch may receive a control signal from the controller (as shown in FIG. 2), such as a pulse width modulated signal, to engage, disengage, or partially engage, the clutch based on engine, vehicle, and/or transmission operating conditions.

Turbine shaft 23 is also known as a transmission input shaft. Transmission 24 comprises an electronically controlled transmission with a plurality of selectable discrete gear ratios. Transmission 24 also comprises various other gears, such as, for example, a final drive ratio 26. In alternate embodiments, a manual transmission operated by a driver with a clutch may be used. Further, various types of automatic transmission may be used. Transmission 24 is coupled to tire 28 via axle 27. Tire 28 interfaces the vehicle (not shown) to the road 30. In one embodiment, powertrain system 100 is coupled in a passenger vehicle that travels on the road.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions. Further still, fuel delivery may be varied responsive to a driver selected preference for an engine operating mode, as elaborated herein. The relative distribution of the total injected fuel among injectors 166 and 170 may be referred to as an injection type. For example, injecting all of the fuel for a combustion event via injector 166 may be an example of a first injection type, injecting all of the fuel for a combustion event via injector 170 may be an example of a second injection type, injecting two-thirds of the fuel for a combustion event via injector 166 and the other third of the fuel via injector 170 may be an example of a third injection type, injecting a third of the fuel for a combustion event via injector 166 and the other two-thirds of the fuel via injector 170 may be an example of a fourth injection type. Note that these are merely examples of different injection types, and various other types of injection and delivery may be used, and further the approach may be applied to more than two injectors as well.

Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke; during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

A manually operable performance setting switch 198 may be used by a driver to select a preferred mode of engine operation. The switch may allow the controller to adjust engine operation settings towards a fuel economy mode or a performance mode. In one embodiment, switch 198 may be a binary switch allowing the driver a selection among the two modes. In an alternate embodiment, the switch may be a dial that allows the driver to select among a plurality of degrees within each mode. The switch setting may be relayed to controller 12 to perform a control system routine, as further described in FIG. 3, that adjusts engine operating parameters, and a fuel injection and/or fuel delivery type, based on the engine operating constraints and the driver selected engine setting.

Engine 10 may further include a fuel vapor purging system (not shown) for storing and purging fuel vapors to the intake manifold of the engine via vacuum generated in the intake manifold. Additionally, engine 10 may further include a positive crankcase ventilation (PCV) system where crankcase vapors are routed to the intake manifold, also via vacuum.

Storage medium read-only memory 110 can be programmed with computer readable data representing instructions executable by processor 106 for performing the methods described below as well as other variants that are anticipated but not specifically listed.

Figure 3:
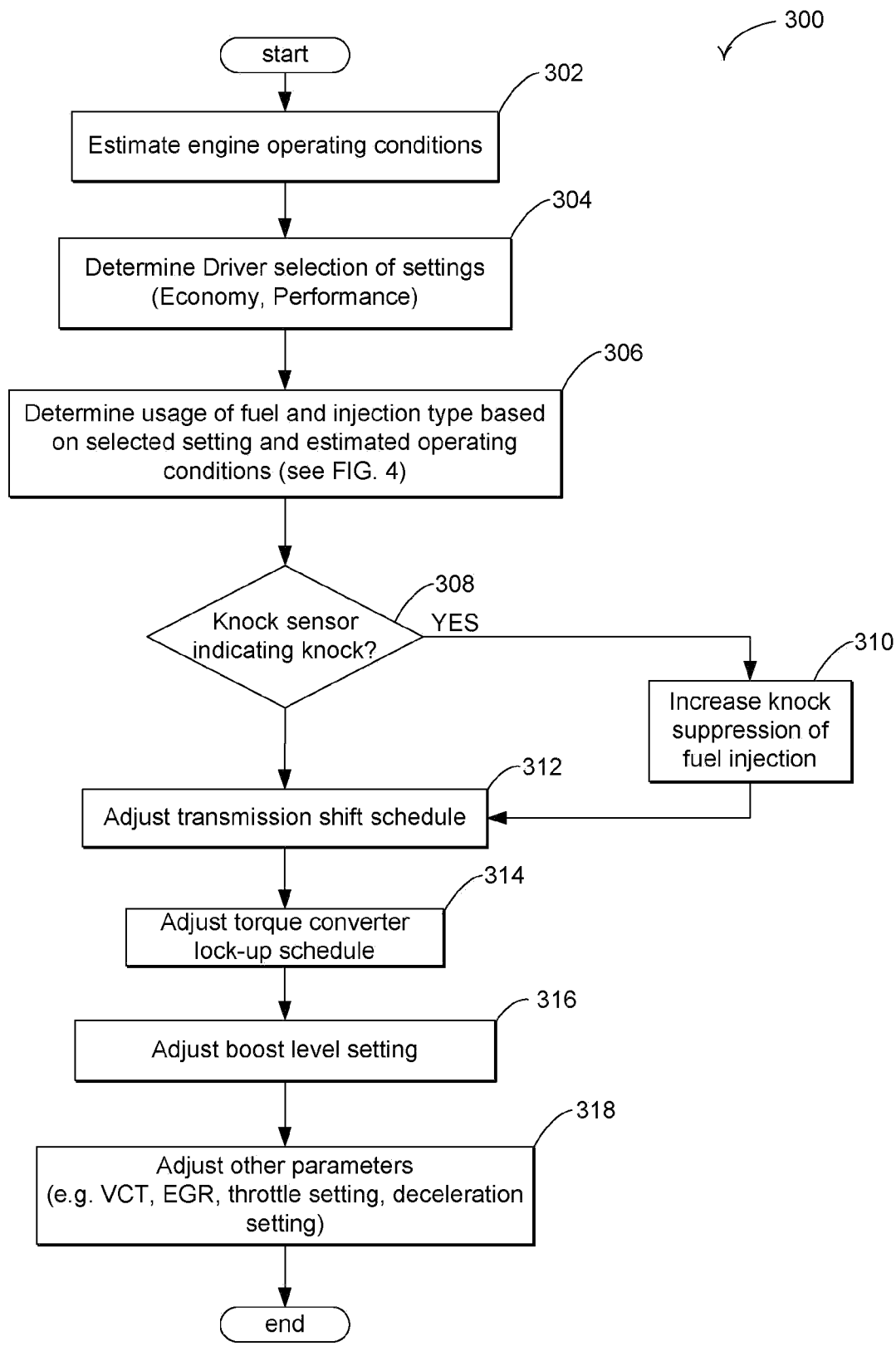
FIG. 3 shows a high level flow chart for engine running operations according to the present disclosure.

FIG. 3 describes a control system routine for an internal combustion engine affecting engine operating parameters, a fuel type delivered, as well as the type of injection used, responsive to at least a driver selected engine operating mode. Specifically, the routine determines the engine operation mode setting selected by the driver and accordingly adjusts usage of a fuel and injection type, and adjusts settings of a variety of engine operating parameters such as valvetrain settings, boost levels, transmission schedules, and deceleration settings, for example. In doing so, the control system allows engine and vehicle operation to be customized and optimized based on the driver's preference towards a higher performance or a higher fuel economy.

At 302, the engine operating conditions are estimated and/or measured. These include, but are not limited to, engine temperature, engine coolant temperature, engine speed, manifold pressure, air-fuel ratio, equivalence ratio, cylinder air amount, feedback from a knock sensor, desired engine output torque from pedal position, spark timing, barometric pressure, etc.

At 304, the driver selected settings are estimated and a preferred engine operating mode is determined. In one embodiment, this may involve estimating the position of a binary switch indicating a performance mode ("P mode") or a fuel economy mode ("F mode"). In an alternate embodiment, this may involve determining a degree of performance or fuel economy selected on a dial. The degrees may be annotated as P1, P2, P3, F1, F2, F3, and so on, based on a configured range of degrees.

Figure 4:
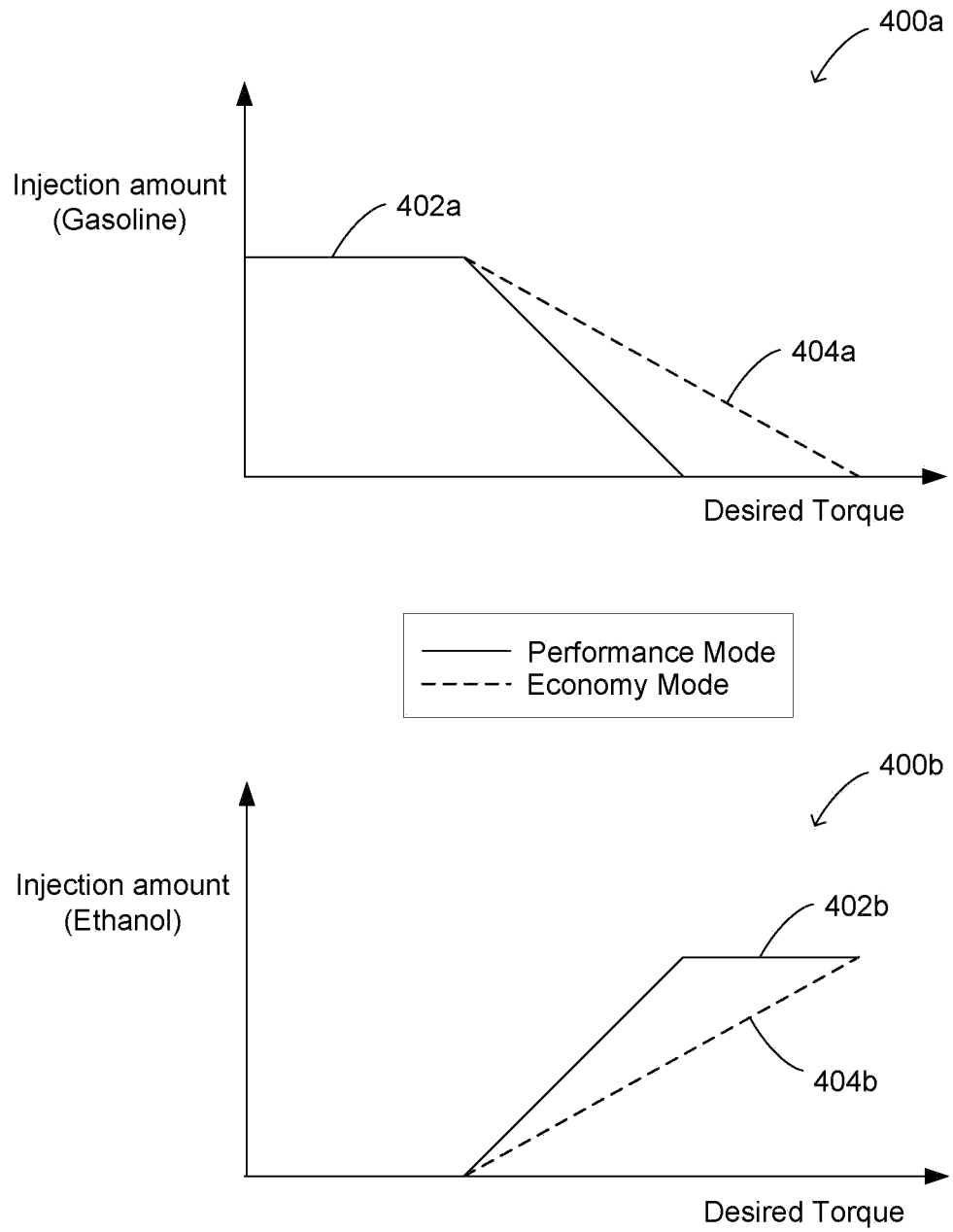
FIG. 4 shows graphs illustrating an example relationship of fuel injection as a function of the desired torque.

Based on the identified current operating conditions, and the driver selected engine operating mode, at 306, a fuel type and injection type are selected. In one embodiment, two different fuels may be used for the two injectors wherein one may be port injected gasoline and the other may be direct injected E85. A map, as depicted in FIG. 4, may be used to generate a look-up table and to determine the injection amount and distribution ratio of fuels responsive to the engine operating conditions and the driver selected settings. In one example, if the driver selected settings indicate a preference for the performance mode, the usage ratio of direct injected E85 may be increased vis-àvis the usage of port injected gasoline. By reading a driver selected performance mode, the engine control system may predict constraints associated with aggressive driving, such as knocking and exhaust overtemperature conditions. Accordingly, by increasing the use of the direct injected ethanol based fuel, including at lower speeds/loads, the control system may take advantage of the charge cooling effect of alcohol, and reduce the constraints anticipated with aggressive driving. As such, the system may then rely less on knock sensor feedback to correct inadvertent knock, or a temperature sensor to correct inadvertent overtemperature during transient load changes.

In another example, if the driver selected settings indicate a preference for the fuel economy mode, the usage ratio of direct injected E85 may be decreased vis-àvis the usage of port injected gasoline. By reading the driver selected fuel economy mode, the engine control system may predict fewer constraints associated with conservative driving habits. Accordingly, the engine operating parameter settings can be adjusted to reserve usage of the direct injected E85 to high loads while adjusting other engine operating parameters, such as an amount of spark retard and/or boost, to alleviate knock constraints at low to medium speeds/loads. As such, in the fuel economy mode, the routine may rely more heavily on a feedback sensor to manage constraints as they arise, instead of anticipating them and taking early preventative steps. In this way, based on the selected mode, the control system may provide the driver with enhanced performance while preferably consuming the port injected gasoline and while deferring usage of the direct injected alcohol.

At 308, a knock sensor is read. If an indication of knock is received, then at 310, an increased injection of the fuel with a higher heat of vaporization and providing knock suppression capabilities ensues. By adjusting fuel injection responsive to feedback from a knock sensor, the routine may adjust knock variations arising from temporary load changes. Thus, in a fuel economy mode, the engine may be configured to respond more heavily to feedback from a knock sensor. In contrast, in a performance mode, the engine may be configured to anticipate knock even at lower speeds/loads and assign a fuel injection ratio accordingly, and to further adjust fuel adjustments based on feedback data from a knock sensor to adjust temporary knock transients.

At 312-318, a variety of engine operating parameters are similarly adjusted based on the driver selected setting, and further based on the fuel injection settings from 306. For example, these adjustments may be based on the predetermined settings as read from a lookup table, for example. Accordingly, at 312, the transmission shift schedule may be adjusted. In one example, when an F mode is selected, the control system may perform an earlier transmission shift, at lower speeds while, when a P mode is selected, the control system may delay the transmission shift to allow for a maximum acceleration to be produced.

At 312, the torque converter lock-up schedule may be adjusted responsive to the chosen operating mode. In one example, when an F mode is selected, the control system may cause engagement of the torque converter lock-up clutch in order to maximize torque converter lock up. Furthermore, the control system may maintain the torque converter in an engaged (or locked) state for a greater amount of time. In doing so, the slip frequency and power losses in the torque converter may be reduced. In another example, when a P mode is selected, the control system may cause disengagement or partial engagement of the torque converter lock-up clutch in order to reduce torque converter lock up. Furthermore, the control system may maintain the torque converter in a disengaged (or unlocked) state for a greater amount of time.

At 316, a boost level may be adjusted responsive to the chosen operating mode. For example, the control system may maintain boosting above a minimum boost level, such as during idle conditions to reduce turbo lag. In one example, for a desired torque, when an F mode is selected, the control system may reduce the minimum boost level while when in a P mode, the control system may increase the minimum boost level. The minimum boost level may be adjusted by adjusting throttle position, late fuel injection (which adjusts exhaust heat), etc. Further, the minimum boost level may further be adjusted in coordination with the fuel injection settings of 308, such that the increased minimum boost is used with a more aggressive use of fuel-based knock suppression. Additional details of this operation are described with regard to FIG. 5.

At 318, other engine operating parameters are adjusted, for example valvetrain settings, VCT settings, exhaust gas recirculation (EGR) settings, throttle settings, and deceleration settings, based on the driver selected engine operating mode. In this way, by adjusting the engine operation settings, such as spark timing, boost level, wastegate position, bypass valve position etc, and further adjusting usage of the fuels based on the driver's preferred engine performance mode, the control system may achieve improved engine performance and improved fuel economy gains. It will be appreciated that further feedback data from a variety of sensors may be used by the control system to further adjust settings in each mode.

Referring now to FIG. 4, it depicts example maps of the desired fuel type based on a desired engine output and based on the engine operating mode selected, for a flexible multiple-fuel engine operating with a port fuel injection of gasoline and a direct injection of an ethanol based fuel, such as E85. In particular, FIG. 4 shows the injection amount of gasoline and ethanol fuels, at 400a and 400b respectively, for a desired torque amount, based on whether a performance mode (solid lines) or a fuel economy mode (dashed lines) is selected. As illustrated by solid lines 402a and 402b, as the desired torque increases in the performance mode, the fuel type shifts from primarily port injected gasoline towards primarily direct injected ethanol. The increased use of the ethanol based fuel at higher torques allows the system to take advantage of the charge cooling effects of alcohol. An aggressive use of alcohol, as depicted by the steeper slope of the solid lines, allows for reduction of constraints associated with high performance engine operations such as exhaust over-temperature conditions and knock conditions, for example. While a similar pattern of usage is shown in the fuel economy mode at 404a and 404b, the more conservative use of alcohol, as depicted by the shallower slope of the dashed lines, allows the alcohol to be conserved for use at a later time, such as during an unexpected knock constraint, or alternately, when the driver changes his operating mode selection. In this way, fuel injection ratios may be calculated based on the anticipated constraints associated with the driver's selection of engine setting. By adjusting the fuel ratio, the various and frequent constraints may be pre-empted in a performance mode setting. In contrast, the fewer and less frequent constraints associated with the fuel economy mode may be addressed on an as need basis.

It should be noted that in addition to the mapping of FIG. 4, additional adjustment of the fuel injections in either mode may be based on feedback from a knock sensor, as indicated in FIG. 3 at 308. Transient knock constraints, as may occur during transient load changes, and as may not be anticipated by the control system, may be addressed by a transient increase in direct injection of the ethanol based fuel, responsive to knock indication from a feedback sensor. However, given that in the fuel economy mode the control system anticipates fewer knock constraints and uses the ethanol fuel less aggressively, transient knock spikes and corresponding direct injection of ethanol spikes may, in one example, occur more frequently, and also at lower speeds/loads compared to the performance mode. Further, in one example, the feedback gains relating the knock sensor feedback and the corresponding increase in direct injection may be higher in the performance mode than in the fuel economy mode, to thereby more aggressively respond to any inadvertent engine knock.

In this way, by dynamically changing engine operating parameters and fuel usage in response to a driver selected preferred engine operating mode, constraints affected by the driver's driving habits may be better anticipated and managed.

Figure 5A:
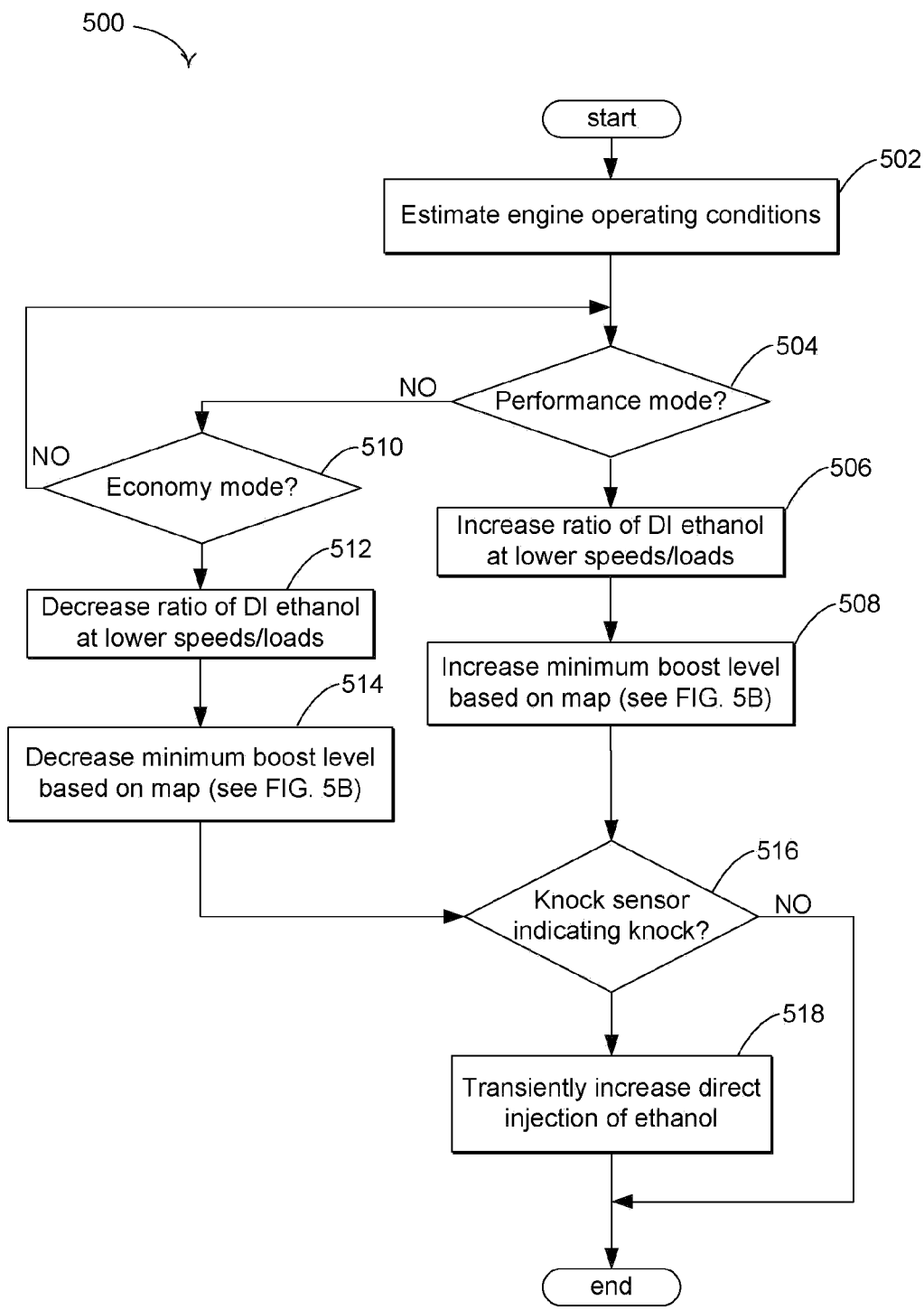
FIG. 5A shows a high level flow chart illustrating an example routine for boost setting adjustments responsive to a driver selected operating mode.
Figure 5B:
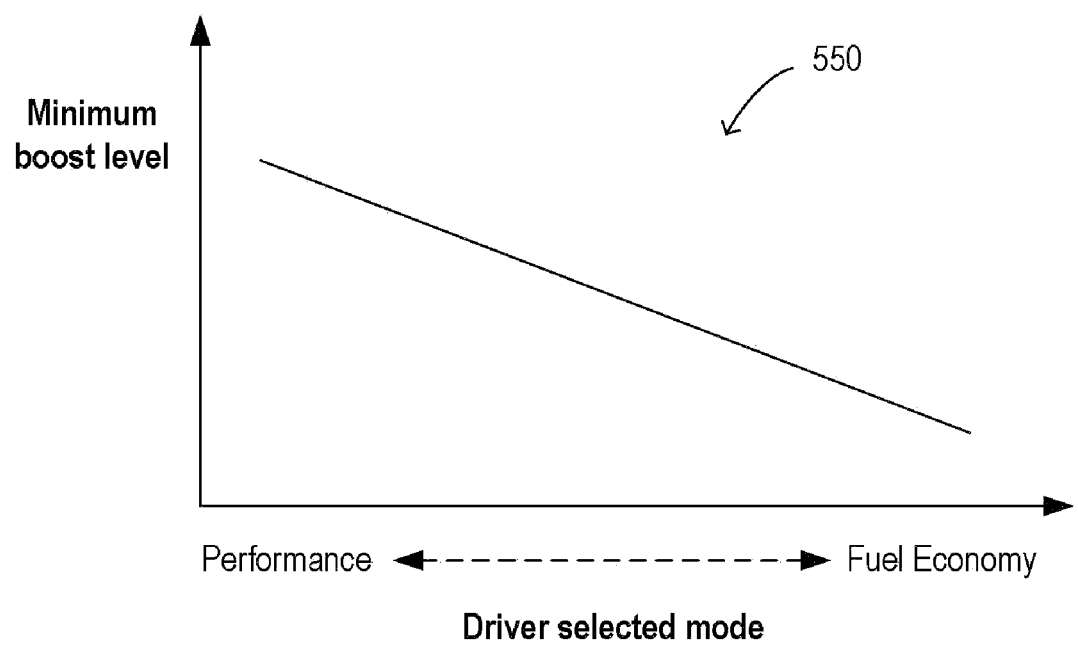
FIG. 5B shows a map of minimum boost level settings for a desired operating mode.

FIG. 5 illustrates an example of the adjustments that may be performed with regards to boost settings based on a driver mode selection. Specifically, FIG. 5A depicts a boost adjustment routine 500 that may be performed by the control system in response to a driver mode selection, based on the settings specified in a "boost map", as depicted in FIG. 5B.

At 502, as in 302, the engine operating conditions are estimated and/or measured. Next, the driver's selection of engine operation mode is determined. Accordingly, at 504, it is determined whether the driver has selected a performance mode. If yes, then at 506, the control system adjusts fuel and injection type settings so that a higher ratio of direct injected ethanol (or an ethanol based fuel) may be preferentially used at respectively lower speeds/loads. The selection of a performance mode enables the control system to anticipate related constraints, such as higher knock and higher exhaust temperatures even at lower speeds/loads. Thus, by appropriately adjusting the fuel and injection ratio towards a higher use of alcohol at the lower speeds, the control system may avert some of these constraints and/or deal with other emerging constraints more effectively. At 508, the control system adjusts the minimum boost level of the turbocharger, based on the settings of map 550 (FIG. 5B). In one aspect, the mapped data from map 550 may be translated into a lookup table that may be used by the control system to assign a minimum boost level. The minimum boost level may be adjusted by adjusting throttle position, late fuel injection (which adjusts exhaust heat), etc. Alternatively, the turbocharger settings may be appropriately adjusted to allow a higher minimum amount of intake air pressure to be maintained. In doing so, the control system may be able to more quickly respond to the driver's demand for high engine output as and when requested. In this way, fuel injection type/location may be coordinated with the higher minimum boost level to reduce the potential for engine knock once the driver tips in to the pedal.

If at 504, the performance mode is not selected, then at 510, the system verifies if a fuel economy mode was selected. If yes, then at 512, the control system adjusts fuel and injection type settings so that a lower ratio of direct injected ethanol may be preferentially used at the lower speeds/loads. The selection of a fuel economy mode enables the control system to be coordinated with conservative driving habits and hence to anticipate fewer performance-related constraints. Consequently, the control system may readjust settings to allow a more conservative use of the ethanol fuel overall. At 514, the control system further adjusts the minimum boost level, based on the settings of map 550 (FIG. 5B), to a lower minimum boost level since the control system anticipates fewer requests for high engine output.

At 516, irrespective of the engine operating mode selected by the driver, a feedback knock sensor is read to determine if there is any indication of knock. If any knock is indicated, this may be addressed at 518 by transiently increasing a direct injection of ethanol (or the ethanol based fuel).

FIG. 5B illustrates map 550 depicting a variation in minimum boost levels as a mode selection is changed. Map 550 may be used by the control system when performing boost routine 500. Equivalent maps for other engine operating parameters may be used by the control system for appropriately adjusting the parameter settings responsive to the driver's selection. The data of the maps may be configured into a lookup table wherefrom the control system may read and adjust settings in routine 300 and 500. As illustrated in FIG. 5B, as a mode selection moves from a fuel economy mode towards a performance mode, the minimum boost level is raised and consequently a intake manifold pressure is achieved by the turbocharger to enable the engine to provide a faster response to a request for higher engine output.

In this way, an engine operating mode selection indicated by the driver suggests potential constraints and demands to the control system which may then adjust engine operation settings appropriately. By anticipating mode specific constraints and demands, and adjusting engine parameters accordingly, and by further adjusting the parameters in response to feedback data from a knock sensor, the control system addresses engine operating transients and matches engine performance to the driver's selection more effectively.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle's boosted engine and transmission, comprising:
   delivering a first fuel to a cylinder of the engine from a first injector;
   delivering a second, different, fuel to the cylinder of the engine from a second injector,
   varying a relative amount of said first and second fuel as an operating condition varies; and
   adjusting delivery of said second fuel, a transmission shift-schedule, and a minimum boost based on a driver-selected performance mode.

2. The method of claim 1 where the second fuel has a greater heat of vaporization than the first fuel.

3. The method of claim 1 where the second fuel includes alcohol, and where the second fuel is directly injected to the cylinder.

4. The method of claim 3 where the first fuel is port injected to the cylinder.

5. The method of claim 1 where delivery of the first and second fuels is adjusted based on the driver-selected performance mode, and where said adjusting includes increasing the relative amount of the second fuel during an increased vehicle performance mode, and decreasing the relative amount of the second fuel during an increased fuel economy mode.

6. The method of claim 5 further comprising adjusting feedback adjustment of the second fuel based on the driver-selected performance mode.

7. The method of claim 6 wherein the boost operation adjustment includes increasing a minimum boost of a turbocharger during the increased vehicle performance mode, and decreasing the minimum boost during the increased fuel economy mode.

8. The method of claim 1 wherein the operating condition includes engine load.

9. A method for operating a vehicle's engine cylinder, comprising:
   delivering a first fuel to the cylinder from a first injector;
   delivering a second fuel to the cylinder from a second, direct, injector;
   varying a relative amount of said first and second fuel as an engine boost varies; and
   adjusting the boosting by increasing a minimum boost during an increased vehicle performance mode, and decreasing the minimum boost during an increased fuel economy mode.

10. The method of claim 9 where delivery of the first and second fuels is adjusted based on a driver-selected performance mode, and where said adjusting includes increasing the relative amount of the second fuel during the increased vehicle performance mode, and decreasing the relative amount of the second fuel during the increased fuel economy mode.

11. The method of claim 10 wherein the minimum boost is maintained by increasing exhaust gas temperature via a late fuel injection from direct injection of the second fuel.

12. The method of claim 11 where the second fuel has a greater heat of vaporization than the first fuel.

13. The method of claim 12 where the second fuel includes alcohol.

14. The method of claim 13 where the first fuel is port injected to the cylinder.

15. The method of claim 9 further comprising increasing feedback adjustment of the second fuel during the increased vehicle performance mode.

16. A method for a vehicle's boosted engine cylinder and transmission, comprising:
   delivering a first fuel to the cylinder from a first injector;
   delivering a second, different, fuel to the cylinder from a second, direct, injector,
   varying a relative amount of said first and second fuel as an operating condition varies; and
   adjusting delivery of said second fuel, a transmission shift-schedule and torque converter lock-up schedule, and a minimum boost based on a driver-selected performance mode.

* * * * *